Feb. 19, 1935. G. A. MITCHELL 1,991,814
MAT BOX MOUNTING FOR MOTION PICTURE CAMERAS
Filed Feb. 23, 1934
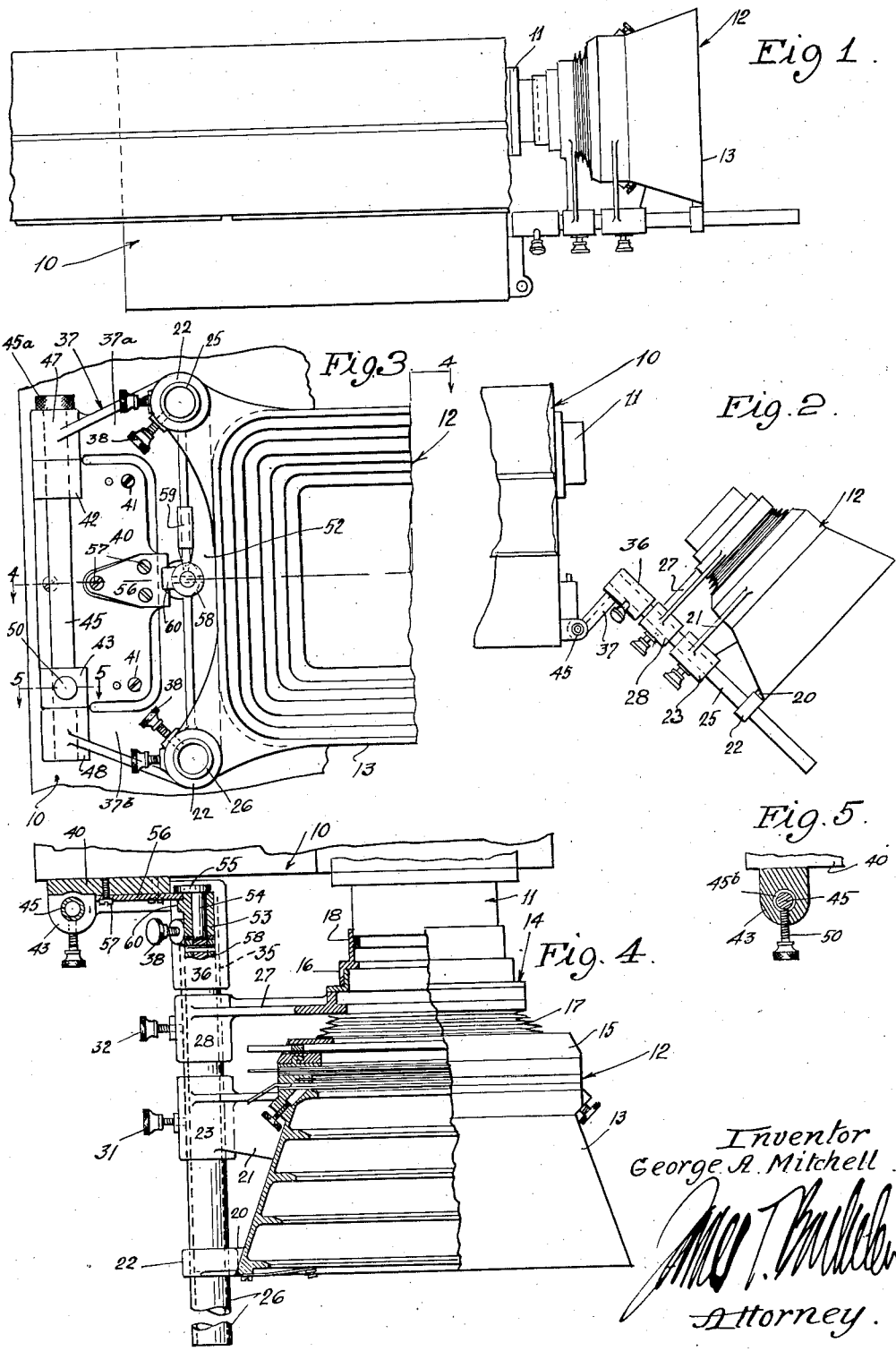
Inventor
George A. Mitchell
Attorney.

Patented Feb. 19, 1935

1,991,814

UNITED STATES PATENT OFFICE 1,991,814

MAT BOX MOUNTING FOR MOTION PICTURE CAMERAS

George A. Mitchell, Los Angeles, Calif., assignor to Mitchell Camera Corporation, West Hollywood, Calif., a corporation of Delaware Application February 23, 1934, Serial No. 712,544

5 Claims. (Cl. 88—1)

This invention relates to improvements in mountings for mat box and sun shade units such as are used before the photographic lens of a motion picture camera.

Motion picture cameras are commonly equipped with a combined sun shade and mat box unit which is mounted adjacent the front side of the photographic lens. In order to permit changing of photographic lenses in the camera, this sun shade and mat box unit must obviously be mounted on the camera in some manner permitting it to be removed from its operative position immediately adjacent the front side of the lens. Also, since photographic lenses of different focal lengths are mounted in lens tubes which project different distances from the front side of the camera, the mounting for the sun shade and mat box unit must be such as will accommodate lens tubes of all different lengths.

It is accordingly an object of the present invention to provide an improved mounting for such a sun shade and mat box unit, which mounting is of a nature such that the device may be adjusted easily and quickly to suit a lens of any given focal length or angle of view, and which also permits the device to be quickly and conveniently moved to an inoperative position out of line with the lens.

The invention will be fully understood from the following detailed description of a present preferred embodiment thereof, reference for this purpose being had to the accompanying drawing, in which:

Fig. 1 is a conventional plan view of a motion picture camera equipped with my improved mat box and sun shade mounting;

Fig. 2 is a view similar to a portion of Fig. 1, but showing the mat box and sun shade unit swung out to an inoperative position out of line with the lens;

Fig. 3 is a front elevational view of the mounting for the mat box and sun shade, being a view looking toward the left in Fig. 1;

Fig. 4 is a section taken on the broken line 4—4 of Fig. 3; and

Fig. 5 is a detail section taken on line 5—5 of Fig. 3.

In the drawing numeral 10 designates generally a motion picture camera, having projecting from its forward side a photographic lens tube 11, which lens tube may be of any usual type and may have any usual mounting provisions permitting the lens to be focussed, or removed for replacement by a lens tube containing a lens of different characteristics. The mat box and sun shade unit is designated generally at 12, being shown in Fig. 1 in operative position alined with photographic lens tube 11.

Unit 12 is made up of a forward sun shade casting 13, formed as a somewhat rearwardly converging light conduit of suitable cross section, and a rear mat box device 14 positioned at the rear of sun shade 13, and made up of front and rearward sections 15 and 16, connected by a contractible and extensible bellows 17. Mat box sections 15 and 16 may be provided with suitable mat and filter holders as desired. Section 15 is mounted as shown on the rear end of sun shade casting 13, while section 16 has a rearwardly extending tube 18 adapted to receive the forward end of the lens tube 11 of the camera when the device is adjusted to position (see Fig. 4). Such a mat box and sun shade device is well known to the art, and its details need not here be further described.

Extending laterally from one side of sun shade casting 13, are front and rear pairs of integrally formed upper and lower suporting arms 20 and 21, respectively, on the outer ends of which are alined bearings 22 and 23 adapted to receive and slide on a pair of horizontal parallel supporting rods or tubes 25 and 26, arranged in vertical alinement as shown in Fig. 3. The rearward mat box section 16 is likewise provided with a pair of upper and lower arms 27 having bearings 28 adapted to slidably receive rods 25 and 26. The upper and lower bearings 23 on arms 21, which are integral with the sun shade and forward mat section of the device, and the upper and lower bearings 28 on arms 27 integral with the rear mat section, are provided with thumb screws 31 and 32, respectively, adapted to be set up against guide rods 25 and 26 to clamp the two relatively movable sections of the device securely in position thereon.

The inner ends of rods 25 and 26 are slidably received within bores 35 in bosses 36 formed at the upper and lower ends of a vertically pivoted bracket member 37, and are set tightly therein by thumb set screws 38 threaded in bosses 36. Bracket 37 is hinged to and carried by a plate 40 which is adapted to be secured, as by screws 41, directly against the front face of the camera, and to one side of the camera lens. This plate 40 is provided with upper and lower bearings 42 and 43, respectively, for a vertical hinge pin 45 which passes through the upper and lower hubs 47 and 48 of bracket member 37, said hubs coming adjacent the upper and lower sides of bearings 42 and 43, respectively. Hinge pin 45 is shown provided with an upper head 45a adapted to rest on the upper end of bracket hub 47. Bearing 43 is shown provided with a thumb screw 50 adapted to engage in an annular groove 45b formed in hinge pin 45, this provision locking the hinge pin in position.

Bracket member 37 is in the general shape of a yoke, its arms 37a and 37b which support hubs 47 and 48, respectively, receiving plate 40 between them in the manner shown in Fig. 3. The vertical portion 52 of the bracket connecting bracket arms 37a and 37b, is provided at its center with a cylindrical boss 53 in which is rotatively mounted an eccentric clamp pin 54, on the inner end of which is an eccentric 55 adapted to engage behind a clamp plate 56 fastened, as by screws 57, to the front side of mounting plate 40. Mounted on the forward end of eccentric pin 54 is a head 58 carrying a clamp operating thumb piece 59. It will be obvious that rotation of pin 54 and eccentric 55 by operation of thumb piece 59 will cause eccentric 55 to engage and disengage from behind plate 56, and thus will lock the device in the position of Figs. 1 and 4, or release it to be swung to the inoperative position of Fig. 2. As a stop to limit the swing of the device inwardly as it is moved from the position of Fig. 2 towards that of Figs. 1 and 4, the boss 53 in which the eccentric pin is mounted is provided with a stop lug 60 which engages the front side of plate 56 when the position of Fig. 4 is reached. After the device has thus reached and been stopped in the position of Fig. 4 by engagement of this stop means, proper operation of the clamping device causes the eccentric 55 to engage back of plate 56, as shown in Fig. 4, and so locks the device in that position.

From the foregoing it will be seen that the sun shade and forward mat section and the rear mat section units may be moved back and forth with reference to the lens, and also independently of each other (within the limits of extension of the bellows), by sliding on rods 25 and 26, and may be set in any desired position with reference to the lens by tightening up screws 31 and 32. For the most part, adjustments to different lenses may be made simply by adjusting only the position of the rear mat section, without the necessity of disturbing the position of the sun shade unit, though it will frequently be found necessary to adjust both sections of the device. When it is desired to gain access to the lens, as for instance to change lenses, the eccentric release clamp is operated and the entire unit, including sun shade, mat box, guide rods and mounting bracket, is simply swung to one side by pivoting on its vertical axis at 45, the device then taking a position for instance as shown in Fig. 2. It will be obvious that this mounting reduces to a minimum the inconvenience involved in adjusting the sun shade and mat box to different lenses, and in removing the same entirely from in front of the lens when such is desirable.

It will be understood the drawing and description are merely illustrative of and not restrictive on the broader claims appended hereto, for various changes in design, structure and arrangement may be made without departing from the spirit and scope of said claims.

I claim:

1. In a motion picture camera having a photographic lens and a mat box unit adapted to be positioned in front of and on the axis of said lens, a mat box unit mounting comprising a guide member including a pair of parallel horizontal guide rods disposed alongside the mat box unit, means on the mat box unit slidably engaging said rods, in such manner that the mat box unit may slide on said rods along its center line, a mounting member interconnecting and supporting the rear ends of said guide rods, a supporting plate affixed to the camera front, means hingedly supporting said mounting member on a vertical pivot axis disposed to one side of the camera lens, and means for releasably locking said mounting member to the supporting plate when the mounting member is in a position with the guide rods parallel to the lens axis.

2. In a motion picture camera having a photographic lens and a mat box unit adapted to be positioned in front of and on the axis of said lens, said mat box unit including front and rear mat box sections interconnected by a contractible and extensible bellows, a mat box unit mounting comprising a horizontal guide and supporting member disposed alongside the mat box unit, means on both mat box sections slidably engaging said guide and supporting member, in such manner that the mat box sections may slide independently on said member along their common center line, and a supporting plate affixed to the camera front and hingedly supporting said guide member on a vertical pivot axis to one side of the camera lens.

3. In a motion picture camera having a photographic lens and a mat box unit adapted to be positioned in front of and on the axis of said lens, said mat box unit including front and rear mat box sections interconnected by a contractible and extensible bellows, a mat box unit mounting comprising a guide member including a pair of parallel horizontal guide rods disposed alongside the mat box unit, means on both the mat box sections slidably engaging said rods, in such manner that the mat box sections may slide independently on said rods along their common center line, a mounting member interconnecting and supporting the rear ends of said guide rods, and a supporting plate affixed to the camera front and hingedly supporting said mounting member on a vertical pivot axis disposed to one side of the camera lens.

4. In a motion picture camera having a photographic lens and a camera attachment adapted to be positioned in front of and on the axis of said lens, a mounting for said camera attachment comprising a guide member including a pair of parallel horizontal guide rods arranged one above the other alongside, said attachment means on said attachment slidably engaging said rods, in such manner that the attachment may slide on said rods in a direction parallel to the axis of the lens, a mounting member interconnecting and supporting the rear ends of said guide rods, said mounting member having a pair of upper and lower arms extending at right angles to the parallel guide rods and away from the camera attachment, a supporting plate affixed to the camera front to one side of the camera lens and adapted to lie between the arms of said mounting member, and a vertical pivot pin pivotally mounting said arms on said supporting plate.

5. In a motion picture camera having a photographic lens and a camera attachment adapted to be positioned in front of and on the axis of said lens, a mounting for said camera attachment comprising a horizontally extending guide element disposed alongside said attachment, means on said attachment slidably engaging said guide element, in such manner that the attachment may slide on said guide element in a direction parallel to the axis of the lens, a mounting member supporting the rear end of said guide element, a supporting plate affixed to the camera front, means hingedly supporting said mounting member on a vertical pivot axis disposed to one side of the camera lens, and means for releasably locking said mounting member to the supporting plate when the mounting member is in a position with the horizontally extending guide element parallel to the lens axis.

GEORGE A. MITCHELL.